United States Patent
Yook et al.

(10) Patent No.: US 7,984,117 B2
(45) Date of Patent: Jul. 19, 2011

(54) NETWORKING METHOD AND APPARATUS

(75) Inventors: Hyun-gyoo Yook, Seoul (KR);
Min-seok Lee, Pohang-si (KR);
Seong-joon Lee, Seongnam-si (KR);
Kyoung-hoon Yi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2212 days.

(21) Appl. No.: 10/442,651

(22) Filed: May 21, 2003

(65) Prior Publication Data
US 2004/0047298 A1 Mar. 11, 2004

(30) Foreign Application Priority Data
May 23, 2002 (KR) .................. 10-2002-0028653

(51) Int. Cl.
*G06F 15/177* (2006.01)
(52) U.S. Cl. ........ 709/220; 709/208; 709/209; 709/210; 370/254
(58) Field of Classification Search .................. 709/208, 709/209, 210, 220; 370/254
See application file for complete search history.

(56) References Cited

U.S. PATENT DOCUMENTS

| | | | | |
|---|---|---|---|---|
| 5,805,817 | A | * | 9/1998 | Yu et al. ................... 709/224 |
| 6,298,069 | B1 | | 10/2001 | Prabhu et al. |
| 6,653,933 | B2 | * | 11/2003 | Raschke et al. ............. 370/203 |
| 7,483,370 | B1 | * | 1/2009 | Dayal et al. ................. 370/219 |

FOREIGN PATENT DOCUMENTS

| | | |
|---|---|---|
| JP | 6-164587 A | 6/1994 |
| JP | 7-303111 A | 11/1995 |
| JP | 11-242642 A | 9/1999 |
| JP | 2000-312383 A | 11/2000 |
| JP | 2001-144779 A | 5/2001 |
| JP | 2001-203732 A | 7/2001 |
| JP | 2005-514861 A | 5/2005 |

* cited by examiner

*Primary Examiner* — Adnan Mirza
(74) *Attorney, Agent, or Firm* — Sughrue Mion, PLLC

(57) ABSTRACT

A networking method and apparatus for managing information between a master device and a slave device is provided. In the network, a master device and at least one slave device are connected to each other via an RS-232 port. Through the operation of the network, the master device can obtain the identifiers (IDs) of the slave devices, and connections among the slave devices can be ascertained. Accordingly, a majority of digital home appliances establish a network using a communication medium, such as RS-232 provided to a fundamental external interface. The present invention enables digital home appliances connected on the network to exchange information.

9 Claims, 20 Drawing Sheets

FIG. 3

| Bits Rate | 19200 bps |
|---|---|
| Data Bits | 8 bits |
| Parity | None |
| Stop Bits | 1 bit |
| Flow Control | None |

FIG. 4

| CABLE LENGTH | NO MORE THAN 4m |
|---|---|
| MAXIMUM NUMBER OF CONNECTED DEVICES | NO MORE THAN 4 (THE NUMBER CAN BE CONTROLLED AFTER TESTING) |
| USED SIGNAL LINES | TxD, RxD, GND |
| CONNECTION BETWEEN MASTER AND SLAVE | TxD-RxD<br>RxD-TxD<br>GND-GND |
| CONNECTION BETWEEN SLAVES | TxD-TxD<br>RxD-RxD<br>GND-GND |

FIG. 5
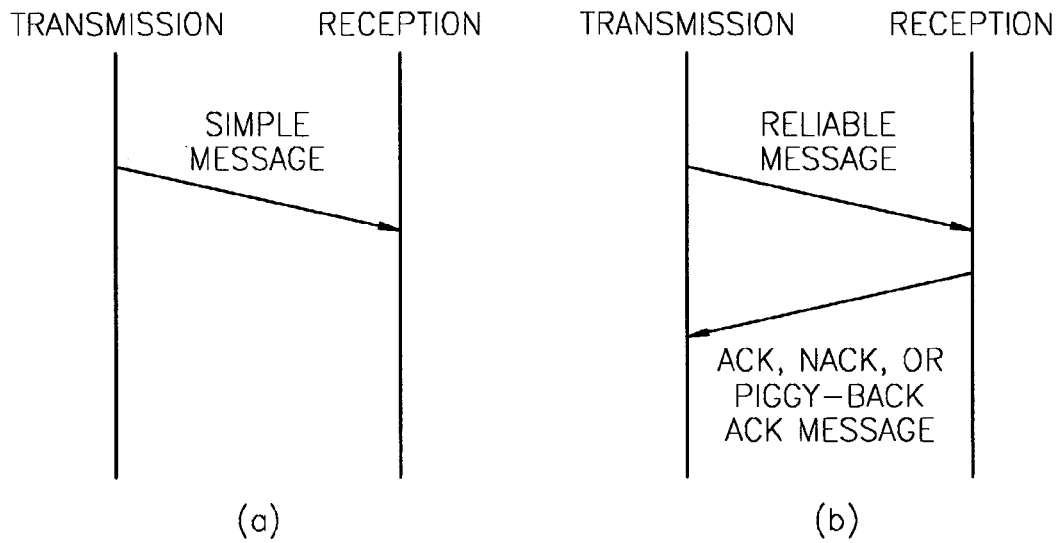
FIG. 6
| Begin of Msg. | | Msg. Type | Dest. ID |
|---|---|---|---|
| Src. ID | Msg. No. | Msg. Body Length | Header CHK |
| Msg. Body | ... | ... | CHK |
FIG. 7
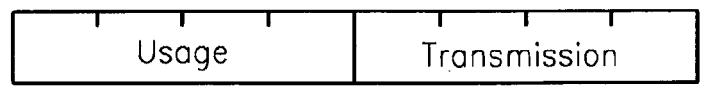

FIG. 8

| 0xAA | 0xAA | 0x00 | Dest. ID |
|---|---|---|---|
| Src. ID | Msg. No | Msg. Body Length | Msg. Body |
| Msg. Body | ... | ... | CHK |

FIG. 9

| 0xAA | 0xAA | 0x01 | Dest. ID |
|---|---|---|---|
| Src. ID | Msg. No | Msg. Body Length | Header CHK |
| Msg. Body | ... | ... | CHK |

FIG. 10

| 0xAA | 0xAA | 0x02 | Dest. ID |
|---|---|---|---|
| Src. ID | Msg. No of Org. Msg | 0x00 | Header CHK |

FIG. 11

| 0xAA | 0xAA | 0x03 | Dest. ID |
|---|---|---|---|
| Src. ID | Msg. No of Org. Msg | 0x01 | Header CHK |
| ... | CHK | | |

FIG. 12

| 0xAA | 0xAA | 0x04 | Dest. ID |
|---|---|---|---|
| Src. ID | Msg. No of Org. Msg | Data Length | Header CHK |
| Data | ... | ... | CHK |

FIG. 13

| 0xAA | 0xAA | 0x1x | Dest. ID |
|---|---|---|---|
| Src. ID | Msg. No | Msg. Body Length | Header CHK |
| Sys. Op. ID | Parameters | ... | CHK |

FIG. 14

| 0xAA | 0xAA | 0x11 | Dest. ID |
|---|---|---|---|
| Src. ID | Msg. No | Msg. Body Length | Header CHK |
| Service ID | Parameters | ... | CHK |

FIG. 15

| 0xAA | 0xAA | 0x14 | Dest. ID |
|---|---|---|---|
| Src. ID | Msg. No of Org. Msg | Data Length | Header CHK |
| Data | ... | ... | CHK |

FIG. 16

| 0xAA | 0xAA | 0x20 | Dest. ID |
|---|---|---|---|
| Src. ID | Msg. No | Msg. Body Length | Header CHK |
| State ID | Val | ... | CHK |

FIG. 17

| 0xAA | 0xAA | 0x31 | Dest. ID |
|---|---|---|---|
| Src. ID | Msg. No | 0x01 | Header CHK |
| State ID | CHK | | |

FIG. 18

| 0xAA | 0xAA | 0x44 | Dest. ID |
|---|---|---|---|
| Src. ID | Msg. No of Org. Msg | Val Length | Header CHK |
| Value | ... | ... | CHK |

FIG. 19

| 0xAA | 0xAA | 0x51 | Dest. ID |
|---|---|---|---|
| Src. ID | Msg. No | 0x01 | Header CHK |
| Command | CHK | | |

FIG. 20

| ADDRESS RANGE | CONTENT |
|---|---|
| 0x00 | ADDRESS OF MASTER DEVICE |
| 0x01 – 0xFE | ADDRESS RANGE FOR THE ADDRESS OF SLAVE DEVICE |
| 0xFF | ADDRESS FOR BROADCASTING |

```
Discovery() {
    Broadcast MSG_PING;
    While (WaitTime < BCAST_WAIT) do {
        Receive response message of PING
        Retrieve slave device id from the response message.
    }
    For all conflict device id {
        Send MSG_PING to the device id;
        While (WaitTime < BCAST_WAIT) do {
            Receive response message of PING
            Retrieve slave device id from the response message.
        }
    }
}
```

FIG. 23

| 0xAAAA | | 0x11 | DEST. ID |
|---|---|---|---|
| 0x00 | Msg.No. | 0x01 | 0x01 |
| Check | | | |

FIG. 24

| 0xAAAA | | 0x14 | 0x00 |
|---|---|---|---|
| Src. ID. | Msg.No. | 0x01 | 0x01 |
| Dev. ID | Check | | |

FIG. 25

| ITEM | STATE NAME | TYPE | MAXIMUM SIZE | MANDATORY OR OPTIONAL |
|---|---|---|---|---|
| TYPE | TYPE | CHARACTER STRING | 64 | MANDATORY |
| FRIENDLY NAME | NAME | CHARACTER STRING | 64 | OPTIONAL |
| MANUFACTURER | MANUFACTURER | CHARACTER STRING | 64 | OPTIONAL |
| PRODUCT URL | URL | CHARACTER STRING | 256 | OPTIONAL |
| MODEL NUMBER | MODEL_NO | CHARACTER STRING | 64 | OPTIONAL |
| SERIAL NUMBER | SERIAL_NO | CHARACTER STRING | 64 | OPTIONAL |
| PLUG TYPE | PLUG_TYPE | CHARACTER STRING | 1 | MANDATORY |

FIG. 26

```
PlugDetection() {
    For all slaves S {
        Send MSG_GET_PLUG_TYPE to S
        Receive response message from S
    }

For all source or combo devices S {
        For all source or combo devices T except S {
            Send MSG_SIG_OFF to T;
        }
        Send MSG_SIG_ON to S;
        For all sink or combo devices U except S {
            Send MSG_DETECT_SIG_INPUT to U;
            Receive response message from U
        }
    }
}
```

FIG. 28

| 0xAAAA | | 0x11 | Dest |
|---|---|---|---|
| 0x00 | Msg. No. | 0x01 | 0x02 |
| 0x01/0x00 | Check | | |

FIG. 29

| NAME | DESCRIPTION | ID |
|---|---|---|
| PING | TO ASCERTAIN EXISTENCE OR NON-EXISTENCE OF DEVICE | 0x01 |
| SIG_ON/OFF | TO CONTROL THE OUTPUT SIGNAL OF DEVICE | 0x02 |

FIG. 30

| STATE NAME | DESCRIPTION | ID | TYPE | MAXIMUM SIZE | REMARKS |
|---|---|---|---|---|---|
| TYPE | TYPE OF APPARATUS | 0x01 | CHARACTER STRING | 64 | |
| NAME | PRODUCT NAME OF FRIENDLY NAME OF APPARATUS | 0x02 | CHARACTER STRING | 64 | |
| MANUFACTURER | MANUFACTURER | 0x03 | CHARACTER STRING | 64 | |
| PRODUCT_URL | PRODUCT HOMEPAGE URL | 0x04 | CHARACTER STRING | 256 | |
| MODEL_NO | MODEL NUMBER | 0x05 | CHARACTER STRING | 64 | |
| SERIAL_NO | SERIAL NUMBER | 0x06 | CHARACTER STRING | 64 | |
| PLUG_TYPE | PLUG TYPE | 0x07 | ENUM | 1 | DEFINITION OF EACH ENUMERATION VALUE IS REFERRED TO 4.4.5.2 PARAGRAPH |

FIG. 31

| MESSAGE NAME | NUMBER OF RECIPIENTS | TRANSMISSION WAY | PURPOSE | PAGE | DESCRIPTION |
|---|---|---|---|---|---|
| MSG_PING | Broadcast | Reliable | System | p.13 | TO REQUEST IDs FROM ALL OF SLAVE DEVICES THAT PARTICIPATE IN NETWORKING |
| MSG_RESP_PING | Unicast | Piggy ACK | System | p.13 | TO REPORT IDs OF DEVICES TO MASTER DEVICE |
| MSG_SIG_ON | Unicast | Simple | System | p.16 | TO STOP SIGNAL OUTPUTTING |
| MSG_SIG_OFF | Unicast | Simple | System | p.16 | TO START SIGNAL OUTPUTTING |
| MSG_GET_TYPE | Unicast | Reliable | Get State | | TO REQUEST "TYPE" STATE |
| MSG_RESP_GET_TYPE | Unicast | Piggy ACK | Get State | | TO RESPOND WITH "TYPE" VALUE |
| MSG_GET_NAME | Unicast | Reliable | Get State | | TO REQUEST "NAME" STATE |
| MSG_RESP_GET_NAME | Unicast | Piggy ACK | Get State | | TO RESPOND WITH "NAME" VALUE |
| MSG_GET_MANUFACT | Unicast | Reliable | Get State | | TO REQUEST "MANUFACT" STATE |
| MSG_RESP_GET_MANUFACT | Unicast | Piggy ACK | Get State | | TO RESPOND WITH "MANUFACT" VALUE |
| MSG_GET_URL | Unicast | Reliable | Get State | | TO REQUEST "URL" STATE |
| MSG_RESP_GET_URL | Unicast | Piggy ACK | Get State | | TO RESPOND WITH "URL" VALUE |
| MSG_GET_MODEL_NO | Unicast | Reliable | Get State | | TO REQUEST "MODEL_NO" STATE |
| MSG_RESP_GET_MODEL_NO | Unicast | Piggy ACK | Get State | | TO RESPOND WITH "MODEL_NO" VALUE |
| MSG_GET_SERIAL_NO | Unicast | Reliable | Get State | | TO REQUEST "SERIALL_NO" STATE |
| MSG_RESP_GET_SERIAL_NO | Unicast | Piggy ACK | Get State | | TO RESPOND WITH "SERIAL_NO" VALUE |
| MSG_GET_PLUG_TYPE | Unicast | Reliable | Get State | | TO REQUEST "PLUG-TYPE" STATE |
| MSG_RESP_GET_PLUG_TYPE | Unicast | Piggy ACK | Get State | | TO RESPOND WITH "PLUG-TYPE" VALUE |

FIG. 32

| ERROR NAME | DESCRIPTION | ERROR CODE |
|---|---|---|
| ERR_CHK | CHECK SUM ERROR | 0x00 |
| ERR_ECT | OTHER ERRORS | 0x01 |

NETWORKING METHOD AND APPARATUS

BACKGROUND OF THE INVENTION

This application claims the priority of Korean Patent Application No. 2002-28653, filed on May 23, 2002, in the Korean Intellectual Property Office, the disclosure of which is incorporated herein in its entirety by reference.

1. Field of the Invention

The present invention relates to a method and apparatus for constructing a network in which a master device and at least one slave device are connected, and a method of managing the network.

2. Description of the Related Art

Korean Patent Application No. 102000707449 is directed to a conventional audio/video network and a method of controlling the network, and more specifically to Home Audio/Video Interoperability (HAVi) middleware for guaranteeing interoperability among devices connected via an IEEE 1394 network. Referring to FIG. 1, HAVi devices 101 have IEEE 1394 adapters 102, which are connected to one another via IEEE 1394 cables 103. Here, HAVi increases compatibility among software modules installed in different devices for seamless interoperability among the devices. To achieve this, HAVi provides software modules with a plug and play function, a multimedia stream transmission function, a messaging function, an event control function, a registry function, a scheduling function, a stream management function, and a future proofing function. In the plug and play function, nodes that participate in a network are automatically detected and then addresses are provided to the nodes. In the multimedia stream transmission function, audio/video streams can be isochronously transferred using a basis media, IEEE 1394. The messaging function denotes messaging among software modules. If a circumstantial change has occurred anisochronously, the event control function notifies the software modules. The registry function denotes the management (e.g., registration and retrieval) of resources that participate in a network. Examples of the resources are software modules, devices, and the like. The scheduling function denotes the allocation and scheduling of the resources that participate in a network. The stream management function denotes the management (e.g., approval, registration, and retrieval) of streams within a network. In the future proofing function, a device control framework and an application framework are provided so that a new device control module or a new application program module can be dynamically installed and removed.

However, the above-described prior art has the following problems. Firstly, a HAVi function can only be provided by high-performance devices on the level of PCs. Hence, the conventional HAVi function is not suitable to be applied to low-performance digital home appliances.

Secondly, IEEE 1394, the interconnection medium chosen by the HAVi initiative, is a very expensive, high-performance network that supports 500 Mbps. Hence, the inclusion of IEEE 1394 greatly increases the manufacturing costs of products.

Therefore, a network middleware using a low-priced medium is required to provide new services based on the interoperation among current low-performance digital home appliances.

SUMMARY OF THE INVENTION

Accordingly, the invention provides a method and apparatus for providing interoperability among devices connected to one another via low-priced media, such as an RS-232 port.

According to an aspect of the present invention, there is provided a network including a master device and at least one slave device. In the network, the master device is connected to at least one slave device. The master device includes a message production unit, a transmission unit, a reception unit, and a slave ID management unit. The message production unit produces a message commanding the slave devices to transmit ID information, a message commanding the slave devices to output a predetermined signal via their output terminals, and a message commanding the slave devices to transmit information relating to whether their input terminals have received the signal. The transmission unit transmits the produced messages to the slave devices. The reception unit receives responses to the transmitted messages from the slave devices. The slave ID management unit analyzes the responses to check whether there is duplicate ID information among the ID information regarding the slave devices and stores the results of the analysis.

The master device further includes a connection state analysis unit which generates information relating to a connection between a slave device that outputs the signal and a slave device that inputs the signal.

Each of the transmission unit and the reception unit includes an RS-232 port.

The slave device includes a reception unit, a transmission unit, a message production unit, and a dynamic ID management unit. The reception unit receives a predetermined command from the master device and transmits the received command to a next slave device. The transmission unit transmits a response to the received command directly to the master device or transmits the response to the master device via the next slave device. The message production unit produces information on the response to the received command, which is to be transmitted to the master device. The dynamic ID management unit generates an arbitrary number to produce an ID and provides the ID to the message production unit, if the received command represents ID information transmission.

The slave device further includes an input/output unit which outputs a predetermined signal if the received command represents that the signal is output via an output terminal, or receives an external signal.

The reception unit includes a first reception terminal connected to the master device and a second reception terminal connected to the next slave device. The first and second reception terminals are connected to each other so that a signal received from the master device is transmitted to the next slave device via the second reception terminal.

The transmission unit includes a first transmission terminal connected to the master device or a previous slave device and a second transmission terminal connected to the next slave device. The first and second transmission terminals are connected to each other so that a signal received from the next slave device is transmitted to the master device or the previous slave device via the first reception terminal.

Each of the transmission unit and the reception unit includes an RS-232 port.

According to another aspect of the present invention, there is provided a method in which a master device connected to at least one slave device manages information on the IDs of the slave devices. In this method, first, the connected slave devices are commanded to transmit their IDs. Next, the IDs of the slave devices are received from the slave devices. Thereafter, it is determined whether there are duplicate IDs among the received IDs. Then, if there are no duplicate IDs, the received IDs are decided as the IDs of the slave devices.

On the other hand, if there are duplicate IDs, the slave devices that have transmitted the duplicate IDs undergo the ID transmission commanding step, the ID receiving step, and the determination step.

According to another aspect of the present invention, there is also provided a method in which at least one slave device connected to a master device dynamically generates its IDs. In the dynamic ID generation method, a command to transmit an ID is first received from the master device. Next, an arbitrary number is generated and set to be the ID. Thereafter, the ID is transmitted to the master device.

The dynamic ID generation method further includes receiving a command to transmit a new ID from the master device and performing the ID generation step and the ID transmission step.

According to another aspect of the present invention, there is also provided a method in which a master device connected to at least one slave device manages information relating to a connection between slave devices. In this method, plug type information regarding whether each of the slave devices includes an input terminal or an output terminal is read from the slave devices. Next, a slave device with an output terminal is selected from the slave devices based on the plug type information. Thereafter, the selected slave device is commanded to output a predetermined signal via the output terminal of the selected slave device. Then, information relating to whether the slave devices have received the predetermined signal is successively read from all of the slave devices that have input terminals, and information relating to the states of connections among the selected slave device and the slave devices with input terminals is produced based on the information relating to the signal reception. Finally, the last three steps are performed with respect to the slave devices with output terminals except for the selected slave device based on the plug type information in order to produce information relating to connections among all of the slave devices that have output terminals and all of the slave devices that have input terminals.

BRIEF DESCRIPTION OF THE DRAWINGS

The above features and advantages of the present invention will become more apparent by describing in detail exemplary embodiments thereof with reference to the attached drawings in which:

FIG. 3 is a table showing a preferred embodiment of an RS-232 communication specification applied to the present invention;

FIG. 4 is a table showing a preferred embodiment of an inter-device connection specification applied to the present invention;

FIG. 5 illustrates preferred embodiments of messaging methods that are applied to the present invention;

FIG. 6 is a table showing a preferred embodiment of a template of a general message that is applied to the present invention;

FIG. 7 illustrates a preferred embodiment of a bit field format of the message type of FIG. 6;

FIG. 8 is a table showing a simple message template according to a preferred embodiment of the present invention;

FIG. 9 is a table showing a reliable message template according to a preferred embodiment of the present invention;

FIG. 10 is a table showing an ACK message template according to a preferred embodiment of the present invention;

FIG. 11 is a table showing an NACK message template according to a preferred embodiment of the present invention;

FIG. 12 is a table showing a piggy-back ACK message template according to a preferred embodiment of the present invention;

FIG. 13 is a table showing a system message template according to a preferred embodiment of the present invention;

FIG. 14 is a table showing a request message template according to a preferred embodiment of the present invention;

FIG. 15 is a table showing a response message template according to a preferred embodiment of the present invention;

FIG. 16 is a table showing a set state control message template according to a preferred embodiment of the present invention;

FIG. 17 is a table showing a get state control message template according to a preferred embodiment of the present invention;

FIG. 18 is a table showing a get state control response message template according to a preferred embodiment of the present invention;

FIG. 19 is a table showing a device control message template according to a preferred embodiment of the present invention;

FIG. 20 is a table showing a network address area according to a preferred embodiment of the present invention;

FIG. 23 is a table showing an MSG_PING message template according to a preferred embodiment of the present invention;

FIG. 24 is a table showing an MSG_PING response message template according to a preferred embodiment of the present invention;

FIG. 25 is a table showing management items of a device according to a preferred embodiment of the present invention;

FIG. 26 shows a program according to a preferred embodiment of the present invention in which a process of producing information relating to the connection between slave devices in a master device is written in a pseudo code;

FIG. 28 is a table showing an MSG_SIG_ON/OFF message template according to a preferred embodiment of the present invention;

FIG. 29 is a table showing the functions of a PING message and a SIG_ON/OFF message according to the present invention;

FIG. 30 is a table showing parameters that represent the states of a predetermined slave device, according to an embodiment of the present invention;

FIG. 31 is a table showing messages used in the present invention;

FIG. 32 is a table showing error codes used in the present invention;

DETAILED DESCRIPTION OF THE INVENTION

Figure 1:
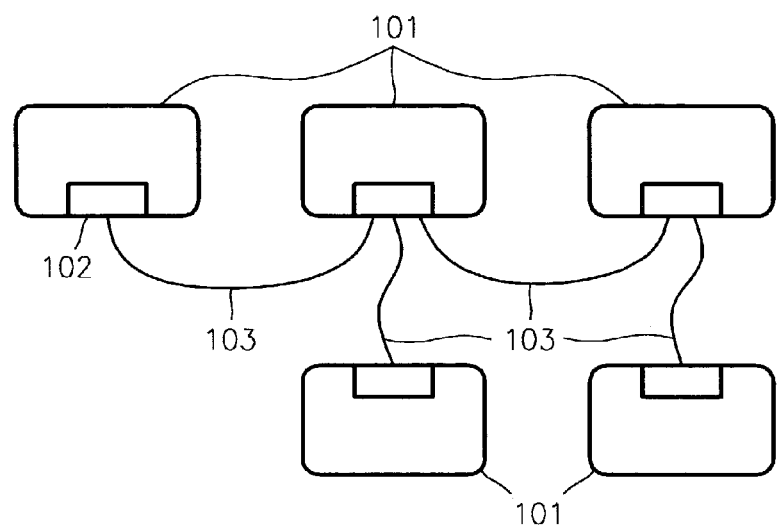
FIG. 1 shows a conventional network.
Figure 2:
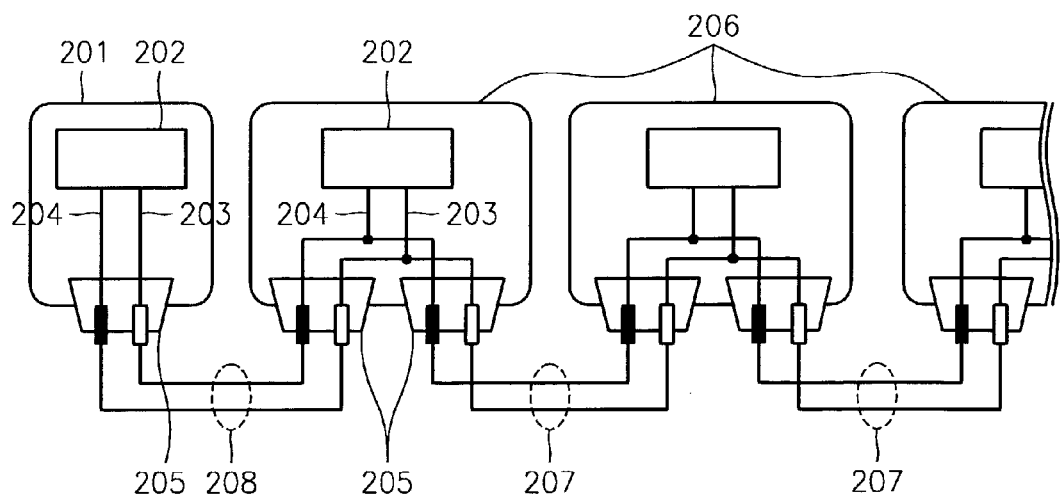
FIG. 2 shows the structure of a network according to the present invention.

A network according to the present invention shown in FIG. 2 includes a master device 201, slave devices 206, and RS-232 cables 207 and 208.

The master device 201 has a universal asynchronous receiver transmitter (UART) 202 for serial communications and an RS-232 port 205. The RS-232 port 205 is connected to an external apparatus via at least a transmission (TxD) line 203 and a receiving (RxD) line 204.

Each of the slave devices 206 has a UART 202 for serial communications and two RS-232 ports 205. The TxD lines 203 of the two RS-232 ports 205 are logically bridged together and the RxD lines 204 thereof are also logically bridged together and the bridged TxD line and RxD line are connected to the UART 202 in each of the slave devices 206.

Two slave devices 206 are connected to each other via the RS-232 cable 207 in which a TxD line and an RxD line do not cross each other. A master device and a slave device are connected to each other via the RS-232 cable 208 in which a TxD line and an RxD line cross each other, which is a normal connection method.

As described above, in a network according to the present invention, a master device and at least one slave device are connected to each other. The slave device has two RS-232 ports, which are internally bridged together. Accordingly, if a signal is transmitted to the TxD line of one port, the same signal is also electrically transmitted to the TxD line of the other port. Consequently, communication between a master device and a slave device is possible, but communication between slave devices is impossible. For example, since the TxD line of a master device is connected to the RxD lines of all slave devices, a signal output from the master device is broadcasted to all of the slave devices. Meanwhile, since the TxD line of a slave device is connected to the TxD line of another slave device, and the RxD line of a slave device is connected to the RxD line of another slave device, communication between slave devices are impossible. For example, if a signal is output from a slave device B via its TxD line, a master device receives the signal via its RxD line and processes the same. However, slave devices A and C receive the signal via their TxD lines, thus the signal cannot be processed.

In this network structure, a master device must be connected to slave devices via a cable in which a TxD line and an RxD line intersect, and slave devices must be connected to each other via a cable in which a TxD line and an RxD line do not intersect. Accordingly, the physical location of the master device is determined depending on the type of cable used, not by a program.

FIG. 3 is a table showing a preferred embodiment of an RS-232 communication specification applied to the present invention. FIG. 4 is a table showing a preferred embodiment of an inter-device connection specification applied to the present invention.

A network operating method according to the present invention is a middleware applicable to a home network and can primarily provide a messaging function, in which messaging is performed between application program modules that are distributed and operate in several devices as in a master device or a plurality of slave devices.

In other words, the network operating method according to the present invention supports the transmission of messages between application programs, which operate in a master device or slave devices that form a network according to the present invention. Messaging (communication) between application programs that are executed between different slave devices is not possible, while communication between application programs that are executed between a master device and each of the slave devices is possible. Data sent from a master device via a network transmission line, such as an RS-232 cable, can be received by all slave devices.

The present invention supports messages, which can be uniquely classified based on a messaging method, a usage purpose, and the like. The formats of messages supported by the present invention are defined as follows.

The messages supported by the present invention can be classified into the following three types depending on how many receivers receive the message. First, a unicast message denotes a message that is transmitted to a single receiver. In a network according to the present invention, as described above with reference to FIG. 2, a message output from a master device can be received by all slave devices without any special manipulation. Preferably, in the case of a unicast message, a slave device which receives messages transmitted by a master device detects a receiver's identifier (ID) value included in the transmitted message and receives and processes the message only if it includes the ID of the slave device itself.

Second, a broadcast message denotes a message that is broadcast to a plurality of receivers that form a network. In the present invention, the type of a broadcasted message is not specified, instead it is identified by a receiver's address or ID value included in the broadcasted message.

For example, the IDs of the above-described devices according to the present invention (i.e., a master device and at least one slave devices) can be set to be from 0x00 to 0xFE. The aforementioned receiver's ID value included in the broadcasted message can be set to be a specific value, such as 0xFF.

Third, a multicast message denotes a message that is transmitted to some of devices that form a network. For example, a multicast message includes a plurality of IDs of devices to receive the multicast message.

The messages supported by the present invention can also be classified into a simple message or a reliable message depending on existence or non-existence of an acknowledge (ACK) signal, which is a reception acknowledge message.

In a simple or unreliable messaging method, a receiver receives a message and then does not transmit a message reception acknowledge signal, that is, an ACK signal, to a transmitter that transmitted the message. Accordingly, the transmitter cannot confirm whether the message it transmitted has been received by the receiver. Preferably, the simple messaging method is applied when a plurality of devices receive broadcast messages or multicast messages.

In a reliable messaging method, a device that received a message transmits an ACK signal to a device that transmitted the message. Accordingly, it can be confirmed whether the receiver has received the transmitted message. Thus, the reliable messaging method is used when stable messaging is required. Reliable messaging can also be used when a device that transmitted a message requires a response message from a device that received the message.

FIG. 5 illustrates a preferred embodiment of the above-described messaging methods that are applied to the present invention. FIG. 5(a) shows a simple messaging method, and FIG. 5(b) shows a reliable messaging method.

The messages used in the present invention can also be classified into the following three types depending on usage purposes.

First, transaction messages denote messages used by a master device to use the services of a slave device. A transaction message is composed of a request message that carries a predetermined command of a master device to a slave device and a response message in response to the request message. The request message is sent by a master device to a slave device in order to request services, and the body of the request message is composed of service IDs and arguments required upon service request. The response message is sent by a slave device to a master device after the slave device has completed providing services. In the present invention, the response message can serve as an ACK signal. If a message includes response data, the response data constitute the body of the message. A request message that does not require a response can adopt the simple messaging method.

Second, state parameter control messages denote messages used for a master device to ascertain the state parameter value of a slave device and change the ascertained state parameter value. A state parameter control message is composed of a set message for changing the state parameter of a slave device, a get message for requesting a state parameter value, and a piggy-back ACK message for returning the requested state parameter value. Since the set message does not include a response value, the set message can use both the simple messaging method and the reliable messaging method.

Thirdly, device control messages denote messages used to transmit a remote controller input code to a slave device. Examples of device control messages include a command message that carries a command of a master device to a slave device, and a response message made in response to the command message. However, if a slave device to receive a command message only serves as a remote controller, the command message can be transmitted in the simple messaging method.

Detailed information on preferred embodiments of the messages used in the present invention is shown in FIG. 31.

Preferred embodiments of the templates of messages used in the present invention will now be described. First, a preferred embodiment of the template of a general message used in the present invention is described. Then, preferred embodiments of the templates of messages classified according to messaging methods are described. Finally, preferred embodiments of the templates of messages classified according to usage purposes are described.

A general message template denotes a general template of messages used in the present invention. The templates of all messages used in the present invention do not deviate from the scope of the general template. The general message template was made without assuming that a network structure used in the present invention is that a master device and a plurality of slave devices are connected to one another such that the present invention can be easily applied to any general network structure.

FIG. 6 is a table showing a preferred embodiment of a template of a general message, which is used in the present invention. The header in the template of FIG. 6 is an identifier for separating a message from noise as used in the present invention. An RS-232 message, which can be used in the present invention, has been used when a programmer monitors the state of an executable program. However, this message for monitoring serves as noise, from the viewpoint of the present invention. Thus, messages used in the present invention must be designed so as to be distinguished from such noise. The header is used to distinguish the messages used in the present invention from noise and can be a predetermined specific value, for example, 0xAAAA. The header CHK in the template of FIG. 6 is a parity value for securing the integrity of a message header. Messages used in the present invention can use an even parity or an odd parity.

Msg. Type in the template of FIG. 6 is information representing the type of a message used in the present invention. FIG. 7 illustrates a preferred embodiment of the bit field format of the message type of FIG. 6. The "transmission" information is filled with a specific value that is determined depending on a messaging method used in the present invention. Examples of the specific value are 0000b (simple message), 0001b (reliable message), 0010b (ACK message), 0011b (NACK message), and 0100b (piggy-back ACK message). A specific value according to usage purposes of a message is allocated to the "usage" information shown in FIG. 7. Examples of the specific value are 0001b (system), 0010b (transaction), 0011b (control-writing of state parameters), 0100b (control-reading of state parameters), and 0101b (remote control).

Referring back to FIG. 6, Dest. ID denotes information on the address or ID of a device that receives a message. If the ID values of devices that form a network according to the present invention are used when a message is transmitted in a unicasting or multicasting method, a predetermined specific value can be used to transmit a multicast message. For example, the values 0x00 through 0xFE can be used when a unicast message is transmitted. The value 0xFF can be used when a broadcast message is transmitted.

In FIG. 6, the number of a message transmission device is allocated to Src. ID.

In FIG. 6, Msg. No., which is a message serial number, denotes a sequence in generating messages. Values within a certain range are used as message serial numbers. For example, values 0x00 through 0xFE are sequentially allocated. After all of the values 0x00 through 0xFE are sequentially allocated, value 0x00 can be re-allocated.

In FIG. 6, "Length" denotes the length of "Msg. Body" information. The "Msg. Body" information corresponds to the data portion of a message and can be composed of at most 256 bytes.

In FIG. 6, "CHK" denotes a parity value for securing the integrity of the body of a message. Messages used in the present invention can use an even parity or an odd parity.

Preferred embodiments of the templates of messages classified depending on the type of messaging methods will now be described.

First, a simple message template according to a preferred embodiment of the present invention is shown in FIG. 8. As described above, a simple message does not require a response message, i.e., an ACK signal. In this embodiment, "0x00" is allocated to "Msg. Type".

Second, a reliable message template according to a preferred embodiment of the present invention is shown in FIG. 9. Referring to FIG. 9, "0x00" is allocated to "Msg. Type".

Third, an ACK message template according to a preferred embodiment of the present invention is shown in FIG. 10. An ACK message is sent from a receiver that received a reliable message to a transmitter that transmitted the reliable message or requested a certain operation, in order to inform the transmitter that the reliable message has been successfully received or that the requested operation has been successfully performed. Referring to FIG. 10, "0x02" is allocated to "Msg. Type", and the message serial Number is the same as that of the reliable message. The message body of the ACK message has no content. Accordingly, "0x00" is allocated to "Msg. Body Length".

Fourth, a NACK message template according to a preferred embodiment of the present invention is shown in FIG. 11. An NACK message is sent from a receiver that received a reliable message to a transmitter that requested the reliable message, if reception of the reliable message has failed or the requested operation has failed to be performed.

Referring to FIG. 11, the type of an NACK message is defined as 0x03, and the message serial Number is the same as that of a reliable message. The body of an NACK message is composed of one-byte error codes that represent the types of generated errors, and accordingly the length is defined as 0x01. The error codes are shown in FIG. 32.

Fifth, a piggy-back ACK message template according to a preferred embodiment of the present invention is shown in FIG. 12. When predetermined data must be sent in response to an operation requested through a reliable message, a piggy-back ACK message from a receiver that received a reliable message is sent to a transmitter that transmitted the reliable message. Referring to FIG. 12, the type of a piggy-back ACK message is defined as 0x04, and the message serial Number is the same as that of a reliable message.

Templates of messages classified depending on usage purposes and used in the present invention will now be described in detail.

First, a system message template according to a preferred embodiment of the present invention is shown in FIG. 13. The type of a system message is defined as 0x1x. A system operation ID is allocated to the first byte of Msg. Body, and data required for system operations is allocated to the remaining bytes. FIG. 29 defines the functions of messages PING and SIG_ON/OFF, which are system operations according to the present invention.

Second, a request message template according to a preferred embodiment of the present invention is shown in FIG. 14. A request message is used for a master device to request a predetermined service from slave devices. Referring to FIG. 14, the type of a request message is defined as 0x11. A service ID is allocated to the first byte of Msg. Body, and parameters required to start a service are allocated to the other bytes. The requested service can be extended or changed according to the types and functions of slave devices that are connected on a network according to the present invention. Accordingly, the type of requested service is not restricted.

Third, a response message template according to a preferred embodiment of the present invention is shown in FIG. 15. A response message is made to a request message. Referring to FIG. 15, the type of a response message is defined as 0x14, and the message serial Number is the same as that of a request message associated with the response message.

Fourth, a set state control message template according to a preferred embodiment of the present invention is shown in FIG. 16. A set state control message is used to set state parameters (i.e., values representing the states of a slave device, such as on, off, play, and stop) of slave devices that form a network according to the present invention.

Referring to FIG. 16, 0x21 is used as the "type" information of a set state control message if ACK is required. Alternatively, 0x20 is used as the "type" information of a set state control message if ACK is not required. The first byte of the "Msg. Body" information is filled with state parameter information, and the subsequent bytes are filled with set state values.

In the state parameter information, values 0x00 through 0x7F indicate state parameter values defined in the present invention, and values 0x80 through 0xFF indicate state parameter values defined in a specific device. FIG. 30 shows parameters that represent the states of a predetermined slave device, according to an embodiment of the present invention.

Fifth, a get state control message template according to a preferred embodiment of the present invention is shown in FIG. 17. A get state control message is used to get the state parameter values of a slave device. Referring to FIG. 17, 0x31 is used as the "Type" information of a get state control message, and state parameter information is allocated to the first byte of the "Msg.Body" information.

Sixth, a get state control response message template according to a preferred embodiment of the present invention is shown in FIG. 18. A get state control response message template is a response message to a get state control message and has parameter values of a requested state.

Referring to FIG. 18, 0x44 is used as the "Type" information of a get state control response message, and the "Msg. No." information of the get state control response message has the same value as the "Msg. No" information of a get state control message corresponding to the get state control response message. A state parameter value is used as the "Msg. Body" information.

Seventh, a device control message template according to a preferred embodiment of the present invention is shown in FIG. 20. A device control message denotes a message for controlling slave devices by sending a remote controller command to a network in which the slave devices are connected. Preferably, the device control message template is designed for a single remote controller application and controls a device using one-byte remote controller input codes.

Referring to FIG. 19, the "Type" information of a device control message has either a value 0x51 or a value 0x40 depending on whether an ACK message is received. The first byte of the "Msg.Body" information of the device control message is filled with a remote controller command code.

A network operating method according to the present invention provides a second function in which, if a new node, that is, a new slave device, is added to or a currently-used slave device is deleted from a network according to the present invention, this change in the network is recognized, and addresses (or IDs) are allocated to currently-connected nodes, that is, slave devices. The second function is hereinafter referred to as a dynamic address allocation function.

In the present invention, a master device detects slave devices, which is performed by transmitting a broadcast message to slave devices connected to a network and analyzing responses that are made by the slave devices to the transmitted broadcast message at random time intervals.

FIG. 20 is a table showing a network address range according to a preferred embodiment of the present invention. Any value in the range of 0x00 to 0xFE is used to represent the address of each of the devices that form a network. 0x00 is allocated to the address of a master device, and 0xFF is allocated to an address for broadcasting. The address (ID) of a slave device is based on the principle that the slave device dynamically produces its address from the range of 0x01 to 0xFE. Here, dynamic production denotes selection of an arbitrary value from the range of 0x01 to 0xFE.

In the present invention, the reason for dynamically producing the addresses (IDs) of devices is that many current digital home appliances have no physical addresses or IDs that distinguishes the digital home appliances from other devices.

Figures 21, 22:
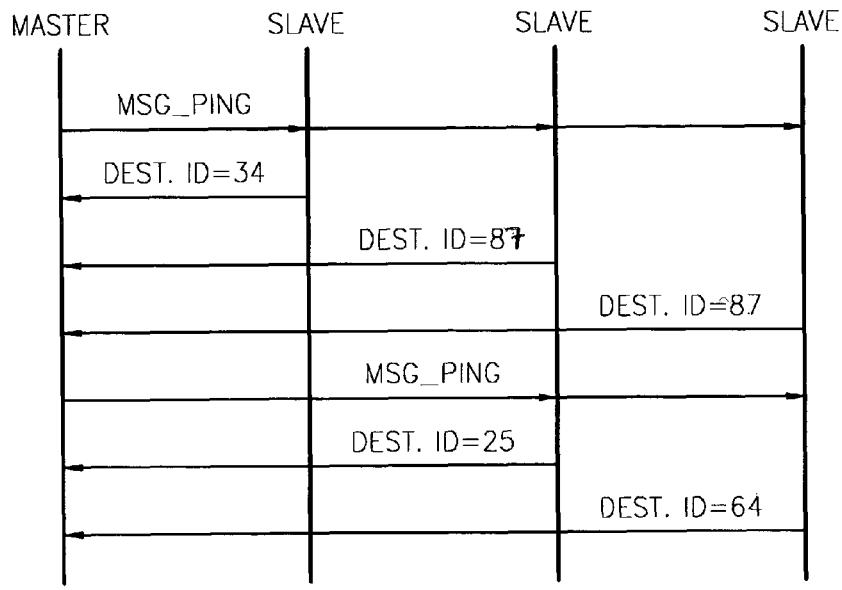
FIG. 21 illustrates a process of obtaining information relating to the identifier (ID) of a slave device from a master device, according to a preferred embodiment of the present invention.
FIG. 22 shows a program according to a preferred embodiment of the present invention in which the process of FIG. 21 is written in a pseudo code.

FIG. 21 illustrates a process of obtaining information relating to the identifier (ID) of a slave device from a master device, according to a preferred embodiment of the present invention. Here, a master device sends a message MSG_PING to all of slave devices connected to a network, and the slave devices dynamically produce their addresses by determining arbitrary values from a range of 0x01 to 0xFE to be address values.

Thereafter, the address values are included in response messages to the message MSG_PING and sent to the master device. The produced address (ID) values of the slave devices must vary dynamically.

Next, the master device analyzes the response messages received from the slave devices in order to determine whether there are addresses or IDs duplicately used for the addresses of the slave devices. If duplicate addresses or IDs are detected, they are set to be Dest.IDs, and the master device re-sends a message MSG_PING to the slave devices corresponding to the Dest.IDs. Then, the slave devices that have dynamically set their duplicate addresses or IDs receive the message MSG_PING, produce new addresses or IDs, and send response messages including information on the new addresses or IDs. This process repeats until all of the slave devices have different addresses or IDs. FIG. 22 shows a program according to a preferred embodiment of the present invention in which the process of FIG. 21 is written in a pseudo code.

Messages associated with the aforementioned dynamic address allocation function will now be described.

Firstly, a message MSG_PING represents that slave devices participating in a network should produce their addresses or IDs and inform a master device of the produced addresses or IDs.

FIG. 23 is a table showing an MSG_PING message template according to a preferred embodiment of the present invention. The system operation ID of the message PING (MSG_PING) is defined as 0x00. Such a MSG_PING may be broadcasted or multicasted. In other words, a message PING is sent before the addresses of the slave devices are determined. If a plurality of devices have the same address, the IDs of the devices are used as the "Dest. ID" information, and a MSG_PING is multicast.

Secondly, an MSG_PING response message is used by devices that have received an MSG_PING and re-produce their IDs. The devices transmit their new dynamic IDs to the master device through the MSG_PING response message. FIG. 24 is a table showing an MSG_PING response message template according to a preferred embodiment of the present invention.

Figure 33:
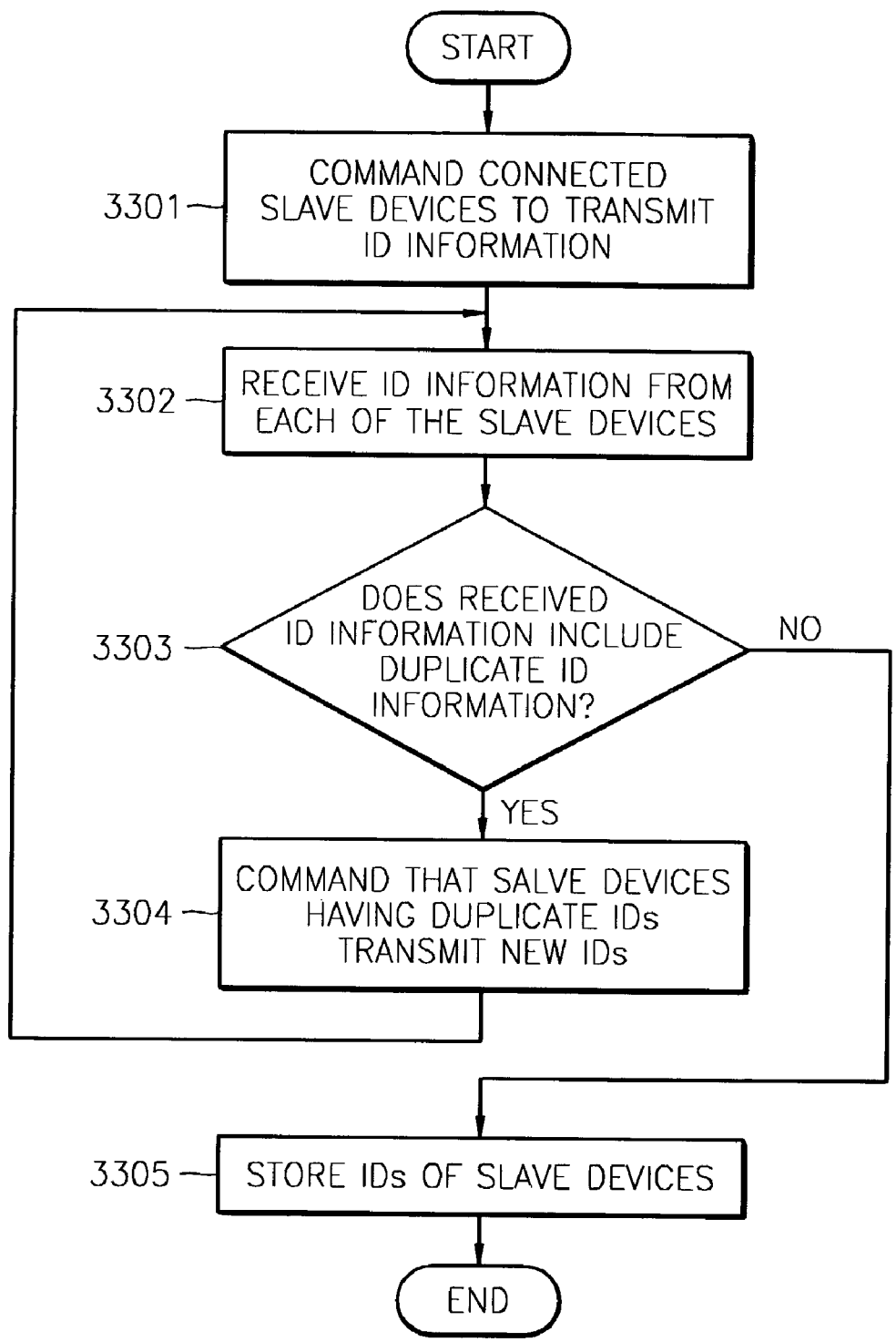
FIG. 33 is a flowchart illustrating a process according to the present invention of obtaining from a master device information relating to the dynamic IDs of slave devices connected to the master device.

FIG. 33 is a flowchart illustrating a process according to the present invention of obtaining from a master device information relating to the dynamic IDs of slave devices connected to the master device. Referring to FIG. 33, in step 3301, the master device commands slave devices connected to the master device via a network to transmit their ID information to the master device. In step 3302, the master device receives ID information from the slave devices. In step 3303, it is determined whether the received ID information includes duplicate ID information. If the received ID information includes duplicate ID information, the master device commands the slave devices that use the duplicate ID information as their IDs to produce new IDs and transmit them to the master device itself, in step 3304. Then, the method goes back to step 3302.

On the other hand, if the received ID information includes no duplicate ID information, the master device stores the information on the IDs of the slave devices, in step 3305.

Figure 34:
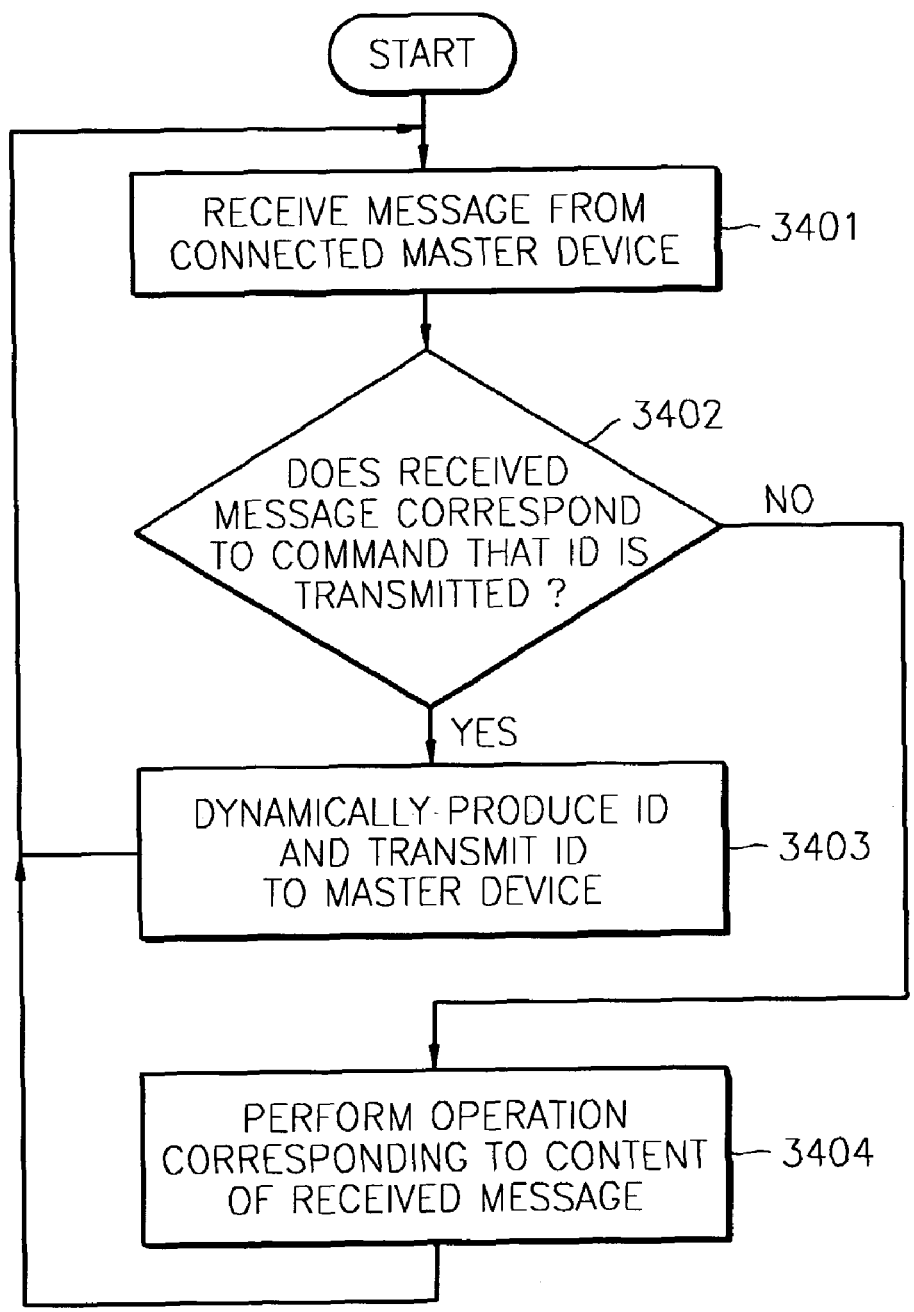
FIG. 34 is a flowchart illustrating a process according to the present invention in which a slave device generates a dynamic ID and provides the dynamic ID to a master device.

FIG. 34 is a flowchart illustrating a process according to the present invention in which slave devices generate dynamic IDs and provide the dynamic IDs to a master device. Referring to FIG. 34, in step 3401, each of the slave devices receives a message from the master device connected to the slave devices. In step 3402, the slave devices determine whether the received message is a command that ID information is transmitted. If the received message is a command that ID information is transmitted, the slave devices dynamically produce their IDs by selecting arbitrary values from a certain ID value range and transmit the produced IDs to the master, in step 3403. Thereafter, the method goes back to step 3401.

On the other hand, if the received message is not a command that ID information is transmitted, each of the slave devices performs an appropriate operation corresponding to the content of the received message, in step 3404. Thereafter, the method goes back to step 3401.

A network operating method according to the present invention provides a third function in which a master device recognizes the machine types of slave devices that are connected to the master device via a network and the state of connection between the slave devices. In the third function, the types and product numbers of the slave devices can be recognized, and connections between the output and input ports of the slave devices can also be recognized.

To be more specific, the master device detects the slave devices using the above-described dynamic address allocation function, allocates an ID to each of the slave devices, and searches the specification of each of the slave devices. In this process, as well as the types and product numbers of slave devices that participate in a network, the states of connections between the slave devices via predetermined signal lines, such as audio or video signal lines, are checked.

FIG. 25 is a table showing the management items of a device according to a preferred embodiment of the present invention. The enumeration value of a plug type item among the management items includes 0x00, 0x01, 0x02, and 0x03. 0x00 indicates that an isolated device has neither an input plug nor an output plug. 0x01 indicates that a source device has only an output plug. 0x02 indicates that a sink device has only an input plug. 0x03 indicates that a combo device has both an input plug and an output plug. Such specification information relating to slave devices can be obtained from a set state control message. Since the specification information of each of the slave devices deviates from the scope of the present invention, it will not be described. However, the specification information must be determined by vendors who supply the slave devices or organizations associated with the vendors.

After the search of the specifications of the slave devices, information on signal cable connections between slave devices are checked. The checking of the information on connections between slave devices can be performed if the following conditions are satisfied.

The first condition is that a master device can control a slave device with an output plug whether to output or not to output. The second condition is that the slave device having an output plug outputs the same signal via all output terminals. The third condition is that a slave device having an input plug can sense from which input terminal a signal is received.

When the above conditions are satisfied, if a master device outputs a signal to only one slave device with an output terminal, a slave device with an input terminal connected to the slave device with an output terminal can sense that the output signal is received via the above input terminal. The slave device with the above input terminal informs the master device of information that the output signal has been received via its input terminal. Through this process, the master device can ascertain how the slave device with the output terminal and the slave device with the input terminal are connected to each other.

Figure 27:
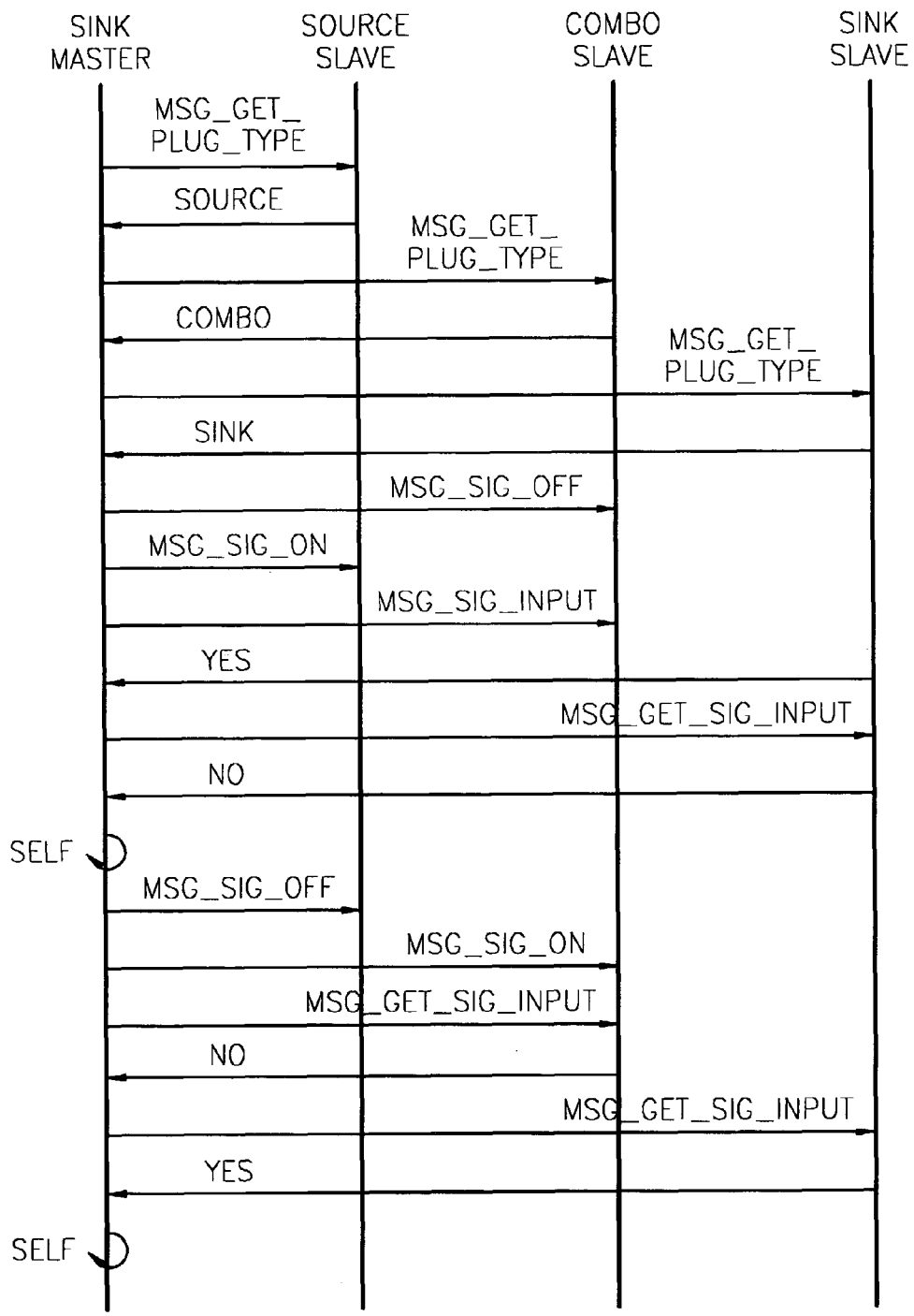
FIG. 27 illustrates the process of FIG. 26.

FIG. 26 shows a program according to a preferred embodiment of the present invention in which production of information on a connection between slave devices in a master device is written in pseudo code. FIG. 27 illustrates the process of FIG. 26 under an assumption that one output device, two sink devices, and one combo device are connected to one another.

A message MSG_SIG_ON/OFF is used in association with the above-described function of obtaining information on connections between slave devices. FIG. 28 shows an MSG_SIG_ON/OFF message template according to a preferred embodiment of the present invention.

Figure 35A:
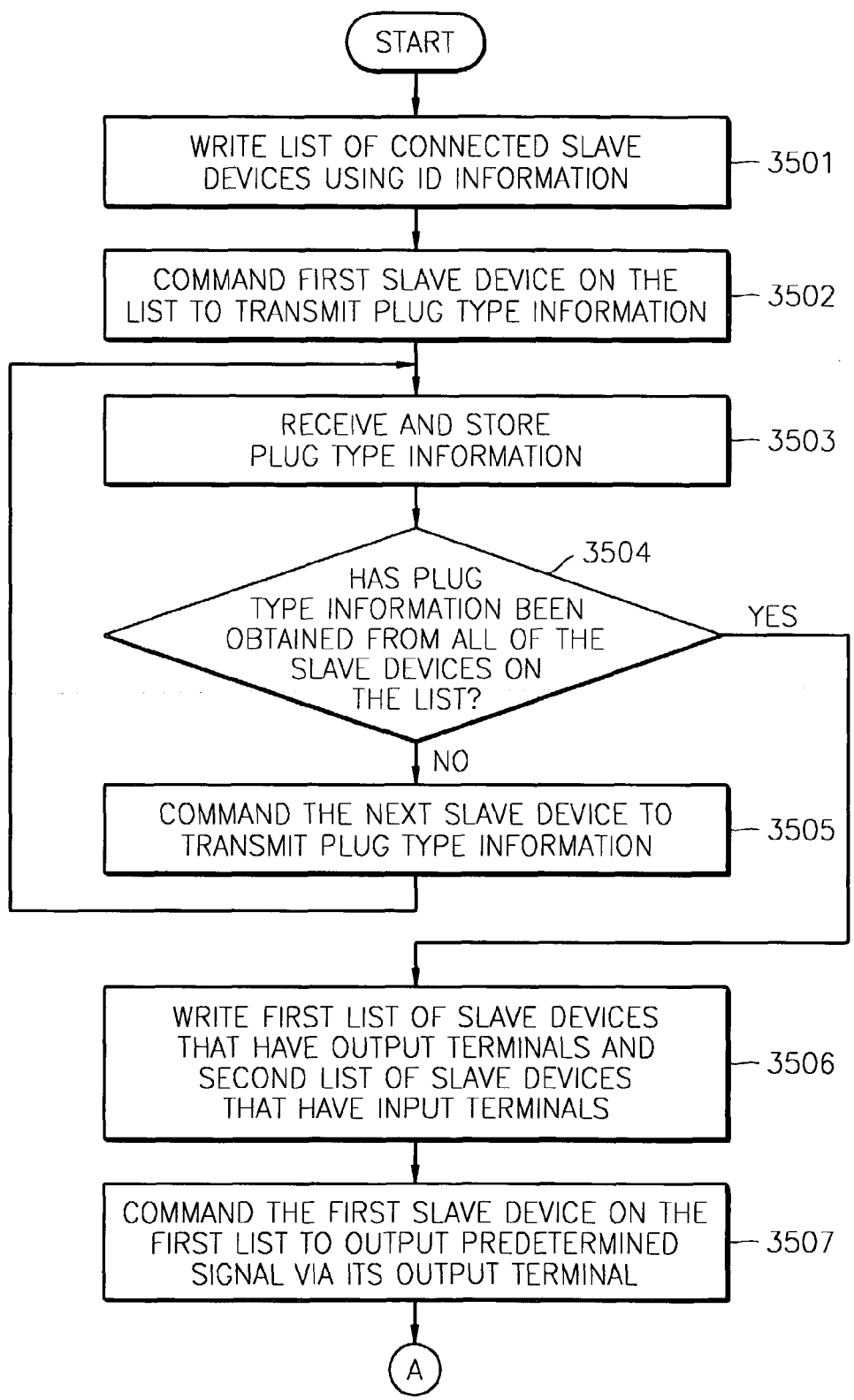
FIGS. 35A and 35B are a flowchart illustrating a method according to a preferred embodiment of the present invention in which a master device manages information relating to the connection between slave devices.
Figure 35B:
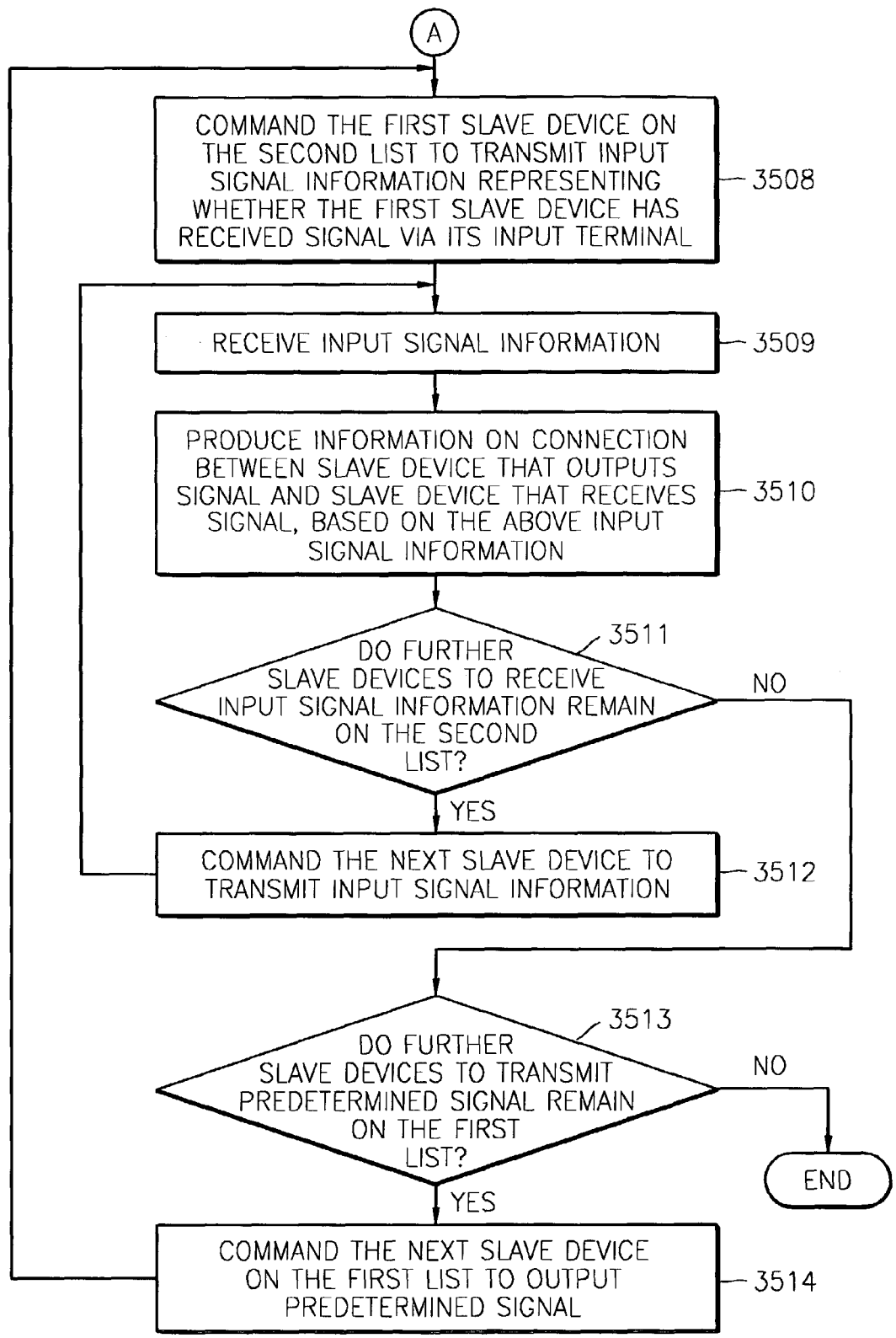

FIGS. 35A and 35B show a flowchart illustrating a method according to a preferred embodiment of the present invention in which a master device manages information relating to the connection between slave devices. Referring to FIG. 35A, in step 3501, the master device writes a list of slave devices that are connected to the master device via a network, using the ID information for the slave devices. In step 3502, the master device commands the first slave device on the slave device list to transmit plug type information. In step 3503, the master device receives the plug type information from the first slave device and stores it. In step 3504, the master device checks if all of the slave devices on the list have transmitted plug type information. If not all of the slave devices on the list have transmitted plug type information, the master device commands a slave device that has not yet transmitted plug type information to transmit plug type information, in step 3505. Then, the method goes back to step 3503.

On the other hand, if all of the slave devices on the list have transmitted plug type information, the master device writes a first list of slave devices that have output terminals and a second list of slave devices that have input terminals, based on the transmitted plug type information, in step 3506. In step 3507, the master device commands the first slave device on the first list to output a predetermined signal via its output terminal.

Referring to FIG. 35B, after step 3507, the master device commands the first slave device on the second list to transmit information on whether the first slave device has received a signal via its input terminal, in step 3508. In step 3509, the master device receives input signal information representing the existence or non-existence of a received signal. In step 3510, the master device produces information relating to a connection between a slave device that outputs a signal and a slave device that receives a signal, based on the received input signal information.

In step 3511, it is checked if the second list has further slave devices to receive a signal. If there are further slave devices to receive input signal information, the master device commands the next slave device on the second list to transmit input signal information, in step 3512. Thereafter, the method goes back to step 3509.

On the other hand, if it is checked in step 3511 that no slave devices to receive input signal information remain, a determination is made as to whether slave devices to output a predetermined signal remain on the first list, in step 3513. If yes, the master commands the next slave device on the first list to output a predetermined signal, in step 3514. Thereafter, the method goes back to 3508. However, if it is determined in step 3513 that no slave devices remain, the process is terminated.

A network operating method according to the present invention provides a fourth function in which a master device remotely controls slave devices. The functions of many current home appliances are mapped with remote controller key values. Accordingly, it is preferable that the remote controller key values are used as codes for remote control.

In the present invention, the master device controls the slave devices using the remote controller key values. Messages associated with this control function are defined according to a device control message template. The remote controller key values of controlled slave devices are used as command languages.

Figure 36:
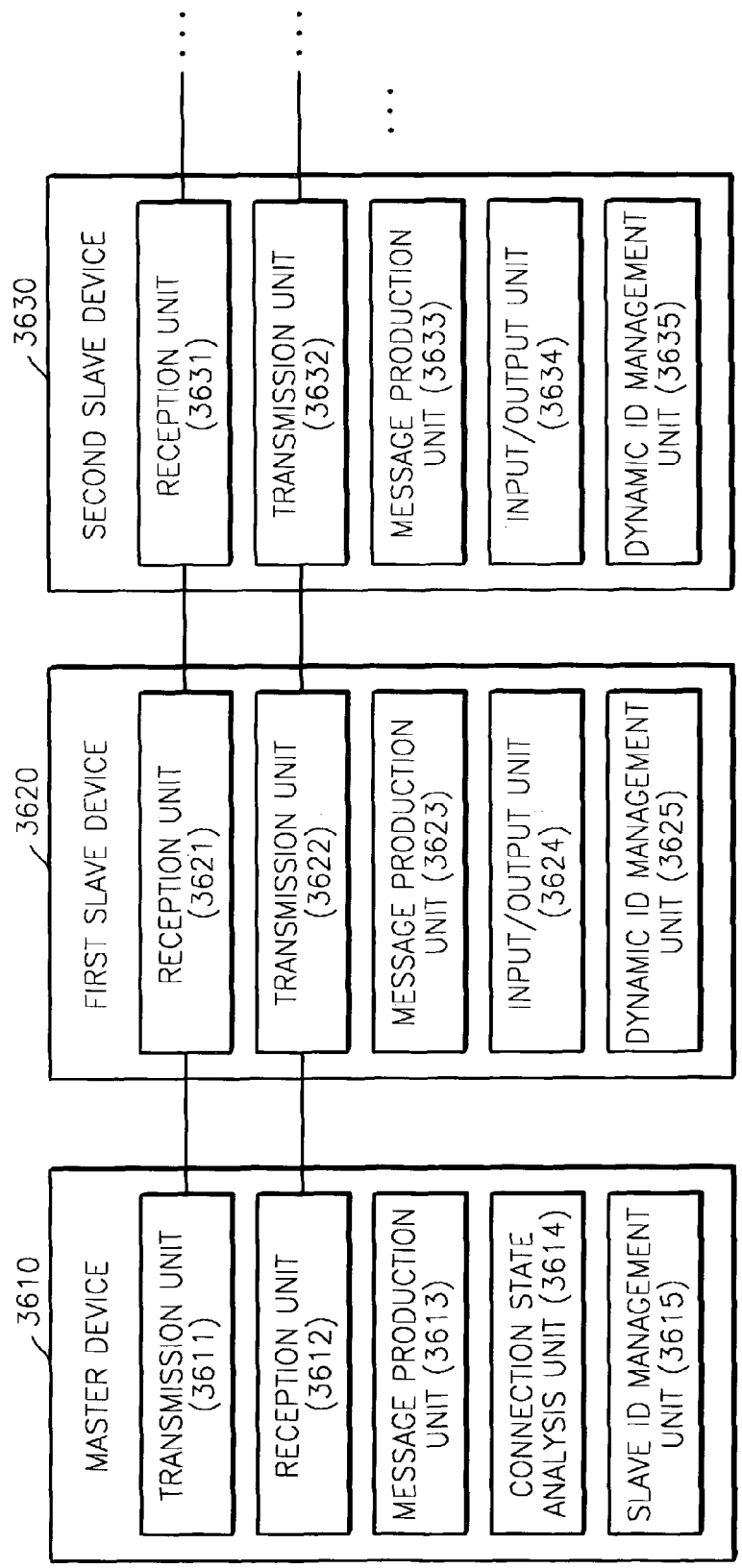
FIG. 36 is a functional block diagram of a network device according to a preferred embodiment of the present invention.

FIG. 36 is a functional block diagram of a network device according to a preferred embodiment of the present invention. In the network device according to the present invention, a single master device 3610 and at least one slave device (for example, first, second slave devices 3620, 3630, . . . ) are connected to each another. The master device 3610 includes a transmission unit 3611, a reception unit 3612, a message production unit 3613, a connection state analysis unit 3614, and a slave ID management unit 3615.

The transmission unit 3611 is connected to a reception unit 3621 in the first slave device 3620 through a network and transmits messages produced by the message production unit 3613 to the slave devices 3620, 3630, . . . through the reception unit 3621 of the first slave device 3620.

The reception unit 3612 is directly connected to a transmission unit 3622 of the first slave device 3620 through a network and receives response messages from the first and second slave devices 3620 and 3630 via a transmission unit 3622 of the first slave device 3620.

The message production unit 3613 produces messages of the above-described message types to be transmitted to the transmission unit 3611.

The connection state analysis unit 3614 obtains plug type information regarding the slave devices 3620, 3630, . . . , commands slave devices with output terminals to output a predetermined signal, collects information on whether slave devices with input terminals have received the output signal, and ascertains the connections among the above slave devices.

The slave ID management unit 3615 commands the first and second slave devices 3620 and 3630 to transmit their IDs. If there are duplicate IDs among the received IDs of the slave devices, the slave ID management unit 3615 receives new IDs from the slave devices having the duplicated IDs and fixes the IDs of the slave devices.

The first slave device 3620 includes the reception unit 3621, the transmission unit 3622, a message production unit 3623, an input/output unit 3624, and a dynamic ID management unit 3625.

The reception unit 3621 is connected to the transmission unit 3611 of the single master device 3610 and to a reception unit 3631 of the second slave device 3630. Alternatively, the reception unit 3621 is connected to the reception units of two different slave devices. The reception unit 3621 receives a message directly from the transmission unit of the master device 3610 or via the reception unit 3631 of the third slave device 3630. In addition, the reception unit 3621 analyzes a recipient's address value contained in the received message to determine whether the received message is supposed to be transmitted to the reception unit 3621 itself.

The transmission unit 3622 transmits a message produced by the message production unit 3623 to the reception unit 3612 of the master device 3610. If the first slave device 3620 is not directly connected to the master device 3610, the transmission unit 3622 transmits the produced message to the master device via the transmission unit 3632 of the second slave device 3630.

The message production unit 3623 produces messages necessary for a response to the message received from the master device 3610 according to the structures of the above-described individual message types.

The input/output unit 3624 includes an output terminal or an input terminal and outputs a predetermined signal via the output terminal in response to a command of the master device 3610 or receives a signal via the input terminal from the output terminal of the second slave device 3630. Then, the input/output unit 3624 reports the output or reception to the master device 3610.

On receipt of a command of the master device 3610 to transmit an ID, the dynamic ID management unit 3625 selects an arbitrary value from a predetermined range of values, sets the selected arbitrary value to be the ID of the first slave device 3620, and transmits the determined ID to the master device 3610.

The above-described embodiments of the present invention can be written as computer programs and can be implemented in a general-purpose digital computer that executes the programs using a computer readable recording medium.

The structure of data used in these embodiments of the present invention can be recorded in a computer readable recording medium in many ways. Examples of the computer readable recording medium include read-only memory (ROM), random-access memory (RAM), CD-ROMs, DVDs, magnetic tapes, floppy disks, optical data storage devices, and so on. Also, the computer programs can be transmitted via a carrier wave such as Internet.

While the present invention has been particularly shown and described with reference to exemplary embodiments thereof, it will be understood by those of ordinary skill in the art that various changes in form and details may be made therein without departing from the spirit and scope of the present invention as defined by the following claims.

According to the present invention, a majority of digital home appliances establishes a network using a communication method, such as RS-232, provided to a fundamental external interface, and the digital home appliances connected on the network can exchange information. Furthermore, a communication standard applicable to the devices connected on the network enables new services through interoperations among a plurality of devices.

What is claimed is:

1. A slave device connected to a master device via a predetermined network, the slave device comprising:
   a reception unit configured to receive a predetermined command from the master device and to transmit the received command to a next slave device;
   a transmission unit for transmitting a response to the received command directly to the master device or for transmitting the response to the master device via the next slave device;
   a message production unit configured to produce information concerning the response to the received command, wherein the response is transmitted to the master device;
   an input/output unit for outputting a predetermined signal if the received command represents that the signal is output via an output terminal, or for receiving an external signal in order to provide the master device information relating to a connection between a slave device that outputs the signal and a slave device that inputs the signal; and
   a dynamic ID management unit configured to generate an arbitrary number to produce an ID and to provide the ID to the message production unit if the received command represents ID information transmission,
   wherein the reception unit includes a first reception terminal connected to a transmission terminal of the master device and a second reception terminal connected to a reception terminal of the next slave device, wherein the first and second reception terminals are connected to each other so that a signal received from the master device is transmitted to the next slave device via the second reception terminal, and
   wherein the transmission unit includes a first transmission terminal connected to at least one of the master device and a previous slave device and a second transmission terminal connected to the next slave device, wherein the first and second transmission terminals are connected to each other and the second transmission terminal is connected to a transmission terminal of the next slave device so that a signal received from the transmission terminal of the next slave device is transmitted to the master device or to the previous slave device via the first transmission terminal, but is not processed by the slave device including the second transmission terminal.

2. The slave device of claim 1, wherein each of the transmission unit and the reception unit includes an RS-232 port.

3. A method in which a master device connected to slave devices manages information relating to a connection between slave devices, the method comprising:
   (a) reading from the slave devices plug type information regarding whether each of the slave devices includes an input terminal or an output terminal;
   (b) selecting a slave device with an output terminal from the slave devices based on the plug type information;
   (c) commanding the selected slave device to output a predetermined signal via the output terminal of the selected slave device;
   (d) successively reading, from all of the slave devices that have input terminals, information relating to whether the slave devices have received the predetermined signal and producing information relating to the states of connections among the selected slave device and the slave devices with input terminals based on the information relating to the signal reception; and
   (e) performing steps (b) through (d) with respect to the slave devices with output terminals, wherein in repeating step (b), a previously selected slave device with an output terminal is not reselected, and producing information relating to connections among all of the slave devices that have output terminals and all of the slave devices that have input terminals,
   wherein the input terminal of the slave device includes a first input terminal connected to an output terminal of the master device and a second input terminal connected to an input terminal of a next slave device, wherein the first and second input terminals are connected to each other so that a signal received from the master device is transmitted to the next slave device via the second input terminal, and
   wherein the output terminal of the slave device includes a first output terminal connected to at least one of the master device and a previous slave device and a second output terminal connected to a next slave device, wherein the first and second output terminals are connected to each other and the second output terminal is connected to an output terminal of the next slave device so that a signal received from the output terminal of the next slave device is transmitted to the master device or to the previous slave device via the first output terminal, but is not processed by the slave device including the second output terminal.

4. The method of claim 3, further comprising an operation in which the master device connected to the slave devices manages information on respective IDs of the slave devices, said operation comprising:

(a) commanding the connected slave devices to transmit their respective IDs;
(b) receiving the respective IDs of the slave devices in response to the command;
(c) determining whether there are duplicate IDs among the respective IDs received from the slave devices; and
(d) deciding on the received IDs as the respective IDs of the slave devices, if it is determined that there are no duplicate IDs.

5. The method of claim 4, wherein if it is determined in step (c) that there are duplicate IDs, steps (a), (b) and (c) are performed again by the slave devices having duplicate IDs.

6. The method of claim 3, further comprising an operation in which the slave devices connected to the master device dynamically generate IDs, said operation comprising:
(a) receiving a command from the master device to transmit an ID to the master device;
(b) generating an arbitrary number and setting the arbitrary number to be the ID; and
(c) transmitting the ID to the master device.

7. The method of claim 6, further comprising: (d) receiving a command to transmit a new ID from the master device; and (e) performing steps (b) and (c) again.

8. A network device comprising:
a master device including:
a message production unit for producing a message commanding slave devices to transmit ID information, a message commanding the slave devices to output a predetermined signal via their output terminals, and a message commanding the slave devices to transmit information relating to whether their input terminals have received the signal;
a transmission unit for transmitting the produced messages to the slave devices;
a reception unit for receiving responses to the transmitted messages from the slave devices, said responses including ID information about the slave devices;
a connection state analysis unit for generating information relating to a connection between a slave device that outputs the signal and a slave device that inputs the signal; and
a slave ID management unit for analyzing the responses received from the slave devices to determine whether there is duplicate ID information among information received from the slave devices; and
a slave device including:
a reception unit for receiving a predetermined command from the master device and for transmitting the received command to a next slave device;
a transmission unit for transmitting a response to the received command directly to the master device or for transmitting the response to the master device via the next slave device;
a message production unit for producing information on the response to the received command, wherein the response is transmitted to the master device;
an input/output unit for outputting a predetermined signal if the received command represents that the signal is output via an output terminal, or for receiving an external signal in order to provide the master device information relating to a connection between a slave device that outputs the signal and a slave device that inputs the signal; and
a dynamic ID management unit for generating an arbitrary number to produce an ID and for providing the ID to the message production unit if the received command represents ID information transmission,
wherein the reception unit of the slave device includes a first reception terminal connected to a transmission terminal of the master device and a second reception terminal connected to a reception terminal of the next slave device, wherein the first and second reception terminals are connected to each other so that a signal received from the master device is transmitted to the next slave device via the second reception terminal, and
wherein the transmission unit of the slave device includes a first transmission terminal connected to at least one of the master device and a previous slave device and a second transmission terminal connected to the next slave device, wherein the first and second transmission terminals are connected to each other and the second transmission terminal is connected to a transmission terminal of the next slave device so that a signal received from the transmission terminal of the next slave device is transmitted to the master device or to the previous slave device via the first transmission terminal, but is not processed by the slave device including the second transmission terminal.

9. A computer program product embodied on a non-transitory computer readable medium for managing network information comprising:
software instructions for enabling the computer to perform predetermined operations, the predetermined operations including:
(a) reading from slave devices plug type information regarding whether each of the slave devices includes an input terminal or an output terminal;
(b) selecting a slave device with an output terminal from the slave devices based on the plug type information;
(c) commanding the selected slave device to output a predetermined signal via the output terminal of the selected slave device;
(d) successively reading, from all of the slave devices that have input terminals, information relating to whether the slave devices have received the predetermined signal and producing information relating to the states of connections among the selected slave device and the slave devices with input terminals based on the information relating to the signal reception; and
(e) performing steps (b) through (d) with respect to the slave devices with output terminals, wherein in repeating step (b), a previously selected slave device with an output terminal is not reselected, and producing information relating to connections among all of the slave devices that have output terminals and all of the slave devices that have input terminals,
wherein the input terminal of the slave device includes a first input terminal connected to an output terminal of the master device and a second input terminal connected to an input terminal of a next slave device, wherein the first and second input terminals are connected to each other so that a signal received from the master device is transmitted to the next slave device via the second input terminal, and
wherein the output terminal of the slave device includes a first output terminal connected to at least one of the master device and a previous slave device and a second output terminal connected to a next slave device, wherein the first and second output terminals are connected to each other and the second output terminal is connected to an output terminal of the next slave device so that a signal received from the output terminal of the next slave device is transmitted to the master device or to the previous slave device via the first output terminal, but is not processed by the slave device including the second output terminal.

* * * * *